United States Patent [19]

Friedrich

[11] 3,899,442

[45] Aug. 12, 1975

[54] RECOVERY AND REACTIVATION OF RHODIUM HYDROFORMYLATION CATALYSTS

[75] Inventor: John P. Friedrich, Green Valley, Ill.

[73] Assignee: The United States of America as represented by the Secretary of Agriculture, Washington, D.C.

[22] Filed: Jan. 31, 1974

[21] Appl. No.: 438,307

[52] U.S. Cl......... 252/416; 260/410.7; 260/410.9 R; 260/413; 260/468 R; 260/483; 260/485 R; 260/485 G; 260/537 R; 260/604 HF
[51] Int. Cl.² B01D 15/06; B01J 37/12; C11C 3/02; C07C 45/02
[58] Field of Search ...... 252/411, 416; 260/604 HF, 260/514 M, 413, 410.9 R

[56] References Cited
UNITED STATES PATENTS

| | | | |
|---|---|---|---|
| 3,463,741 | 8/1969 | Russell | 252/416 |
| 3,539,634 | 11/1970 | Olivier et al. | 260/604 HF |
| 3,547,964 | 12/1970 | Olivier | 260/604 HF |
| 3,787,459 | 1/1974 | Frankel | 260/413 |

Primary Examiner—Patrick P. Garvin
Assistant Examiner—P. E. Konopka
Attorney, Agent, or Firm—David G. McConnell; Max D. Hensley; David G. Mcconnell

[57] ABSTRACT

Soluble rhodium materials are concentrated in the residue from the distillation of hydroformylated products resulting from the reaction of unsaturated hydrocarbons, unsaturated fatty acids, or unsaturated fatty compounds with carbon monoxide and hydrogen in the presence of a supported rhodium catalyst. An active catalyst was provided when the rhodium was recovered and resupported. The same rhodium was recovered and resupported 10 times with no significant loss in activity.

5 Claims, No Drawings

RECOVERY AND REACTIVATION OF RHODIUM HYDROFORMYLATION CATALYSTS

BACKGROUND OF THE INVENTION

This invention relates to the recovery and reactivation of rhodium catalysts which have been used in a method of preparing formyl compounds from the reaction of unsaturated organic compounds with hydrogen and carbon monoxide.

Aldehyde production by catalytic hydroformylation of unsaturated compounds has been known for many years. Cobalt compositions have been the most commonly used catalyst, but they require conditions which result in side reactions and isomerizations. Recently discovered improvements eliminate many problems of prior art hydroformylation methods, but these improved processes require rhodium catalysts which are more expensive than those previously used. Much attention has, therefore, been given to recovery and reuse of the rhodium (e.g., U.S. Pat. Nos. 3,539,634; 3,547,964, France Pat. No. 1,598,768; and Ger. Offen. 2,262,852).

In accordance with the invention, I have discovered in a method of the type wherein unsaturated organic compounds are hydroformylated with hydrogen and carbon monoxide in the presence of a rhodium catalyst, and wherein the hydroformylated products are subsequently filtered and distilled leaving a residue which contains essentially all of the soluble rhodium, an improvement comprising the following steps:
  a. mixing said residue with a refractory catalyst support;
  b. volatilizing and carbonizing essentially all organic materials present in the mixture resulting from step (a); and
  c. heating in the presence of air the carbonized material remaining from step (b) to a temperature sufficient to form carbon dioxide and water therefrom.

The recovery process is such that it can be repeated many times with no significant loss of activity. The recovered catalyst itself has the advantage of being considerably more active than commercial catalysts from which it is recovered.

DETAILED DESCRIPTION OF THE INVENTION

Hydroformylation is the reaction of unsaturated hydrocarbons, fatty compounds, or the like, with hydrogen and carbon monoxide in the presence of a catalyst and is normally carried out at temperatures of about 100°–300° C. and under pressures of from atmospheric pressure to 3000 p.s.i.g. (pounds per square inch gauge).

Rhodium catalysts (i.e., rhodium metal, its oxides, and its salts) are normally used in conjunction with trisubstituted phosphines or phosphites with which, it is theorized, they complex. The preferred catalyst is one in which the rhodium or rhodium compound is adsorbed onto an inert support. However, from 50 to 80 percent by weight of the rhodium is usually solubilized and remains dissolved in the hydroformylated products. This necessitates the purification of the hydroformylated products by distillation leaving the inactive soluble rhodium compositions in the distillation residue.

The hydroformylation procedure used to obtain the distillation residue starting material for the instant method is essentially that claimed in U.S. Pat. No. 3,787,459, which is herein incorporated by reference. However, those skilled in the art will be aware of other hydroformylation methods which will produce distillation residues suitable for use in the instant method.

Catalyst supports suitable for use in the invention must be inert, adsorptive, and refractory (i.e., capable of withstanding temperatures of at least 1000° C. Examples of this type of catalyst supports include alumina ($Al_2O_3$), silica ($SiO_2$), firebrick ($SiO_2$-$Al_2O_3$), and other refractory materials. Also suitable to be used in the invention are the spent refractory supports filtered from hydroformylation reaction products and containing the remaining adsorbed rhodium which was not solubilized by the reaction.

The first step in the recovery of rhodium catalyst is to mix the distillation residue containing the soluble rhodium compounds with inert catalyst support. The ratio of rhodium to support in the final product is not critical to the understanding of this invention since the invention pertains to a method of recovering the catalyst and not to the catalyst itself. Useful catalytic amounts for hydroformylation and useful ratios of catalyst to supports are well documented in the prior art. Supported rhodium catalysts containing from 0.1 to 10 weight percent Rh (i.e., based on rhodium metal) are most easily handled and therefore are preferred for the hydroformylation process.

The purpose of the next step is to remove the organic material present in the distillation residue. This is accomplished by volatilization and carbonization at elevated temperatures. Volatilization and carbonization are defined herein as being essentially a destructive distillation process in which much of the organic material is broken down to form volatile compounds and finally to carbon. For example, methanol and charcoal are produced from the destructive distillation of wood at temperatures from 150° to 450° C., and coke from the destructive distillation of coal at 350° to 1000° C. Volatilization and carbonization should normally be conducted in an atmosphere that contains an amount of oxygen such that the volatile materials given off by the process will not ignite. It is preferred, therefore, to use temperatures of from 150° to 300° C. so that compounds volatile at these temperatures will be given off and sweep most of the air from the reaction vessel, thereby reducing the supply of oxygen in the vessel before temperatures are elevated to the point where these compounds ignite. It is preferred that this step be continued until essentially all of the organic materials are carbonized.

The final step is to increase the temperature to from 350° to 1000°, preferably from 500° to 700° C., and to introduce a stream of air into the reaction vessel. A reaction is allowed to take place between the carbonized material and the oxygen in the air to form carbon dioxide and water for a length of time sufficient to remove all the carbonized material and leave behind only the rhodium catalyst and the refractory catalyst support.

These last two steps could be easily and automatically accomplished by programming temperature increase with time.

The process was performed with a distillation residue from a hydroformylation reaction of an unsaturated fatty compound with hydrogen and carbon monoxide in the presence of a commercial supported catalyst consisting of 5 weight percent rhodium (based on rhodium metal) on alumina and triphenylphosphite. The soluble rhodium catalyst was recovered and resupported on fresh alumina in accordance with the invention. When an identical hydroformylation reaction was performed with the recovered and resupported rhodium catalyst, it was discovered that the recovered, resupported catalyst was significantly more active than the original commercial supported rhodium catalyst. The instant method was repeated nine times with the same catalyst in identical hydroformylation reactions with essentially no loss in activity.

The following examples are intended only to further illustrate the invention and should not be construed as limiting the invention as defined by the claims.

EXAMPLE 1

Hydroformylation

Methyl oleate (500 g.), 5 g. of a commercial supported rhodium catalyst (5% by weight rhodium metal on alumina), and 2.5 g triphenylphosphite were placed in a 2-liter rocker-shaker type autoclave equipped with an external cooling jacket. The reactor was flushed with a 1:1 mixture of $H_2$ and CO and then pressurized with the same mixture to 500 p.s.i.g. The reactor was heated with agitation to 100° C. at the rate of 2° C. per minute. When the temperature reached 100° C., the pressure began to drop rapidly indicating initial reaction. Pressure was increased to from 800 to 900 p.s.i.g. and heating continued to 120° C. Reaction time was 2 hr. and 40 min.

The autoclave was cooled and the excess pressure vented. The contents of the opened vessel were siphoned into a Buckner funnel and filtered under vacuum through Whatman qualitative filter paper. To obtain an accurate material balance the autoclave was rinsed with acetone and this rinse in turn used to wash the spent catalyst support in the filter funnel. The filtered acetone solution was stripped under vacuum and the residue combined with the main filtrate. The combined filtrates weighed 552.5 g.

The filtrate was transferred to a spinning disc type molecular still. The disc temperature was held at 120° C.; the product distilled rapidly at pressures of from 8 to 16 microns. The residue, 34.4 g., was further distilled by pot distillation to give 14.6 g. residue and 532 g. of distillate, Table 1.

EXAMPLE 2

A distillation residue was prepared as in Example 1, and a 0.2-g. sample was analyzed for rhodium content by the method of List et al., J. Amer. Oil Chem. Soc. 50: 210–212 (1973). A 55-g. portion of the residue containing 287 mg. Rh (as rhodium metal) was mixed with 20 g. of a commercial catalyst grade alumina and placed in the vessel of a kiln. The kiln used to reactivate spent catalyst was constructed in house. The vessel was made from a 6-in. long section of 3-in. tubing. The bottom was cut from ⅛-in. plate and welded to one end of the tube. The flange and cover were also ⅛-in. plate and were machined to mate. The cover was fastened to the body with six ⅛-in. bolts and wing nuts. A 4¼ in. length of 1-in. cold rolled steel was attached to the base of the vessel to act as a bearing surface and drive shaft. A 15-in. length of 1-in. pipe was welded to the cover to permit introduction of an air tube and the escape of combustion products. This pipe also served as an axis to support the other end of the rotating vessel. Three 5¾ in. lengths of 3/8-in. rod were used inside the vessel to facilitate mixing. All wetted parts were constructed of 316 stainless steel. The furnace was fashioned of 16-gauge steel and covered with ½-in. asbestos board. Three baffled ports large enough to accept the top of a Fisher burner were welded into the base of the furnace at regular intervals. A port was also placed in the upper half of the furnace to act as a chimney. Bronze bearings made from 1-in. thick stock were fastened to the outside of both ends of the furnace. The vessel was rotated within the furnace at 12 r.p.m. by a small gear head motor. The vessel was closed, placed in the furnace and heated with a Fisher burner to about 280°–300° C. The front of the furnace was elevated slightly so that any liquid condensing in the tube would reflux back into the kiln and be charred. When there was no more evidence of liquid condensate a second burner was added and the temperature raised to about 620° C. A very slow stream of air was introduced into the kiln by means of a ¼-in. tube inserted through the open end of the kiln. The heating was continued for 2 hr. The kiln was cooled and the resupported catalyst removed.

A 16.9-g. portion of the resupported catalyst containing 0.25 g. Rh was used to catalyze the hydroformylation of 500 g. of methyl oleate in the same manner as described in Example 1.

The hydroformylated products were filtered in the same manner, but instead of fresh alumina, the washed spent catalyst support and the filter paper were transferred to the vessel of the kiln to be mixed with the distillation residue.

The filtrate was transferred quantitatively to a 1-liter round-bottomed flask fitted with a 4-in. jacketed Vigreaux column. The methyl formylstearate was distilled at a head temperature of about 185° C. and a pressure of from 0.3 to 0.5 mm, Table 1. The distillation residue was then transferred to the vessel of the kiln.

EXAMPLES 3–11

The distillation residue and the washed spent catalyst support and filter paper from the preceding example were mixed and treated as in Example 2. This resupported catalyst was used to catalyze the hydroformylation of 500 g. methyl oleate. The rhodium catalyst was recycled in this manner eight more times, Table 1.

Table 1

| Example | Reaction time, min. | Conversion, % | Methyl formyl-stearate, g. | Residue, g. | Rh, mg. Residue | Rh, mg. Support | Total[1] |
|---|---|---|---|---|---|---|---|
| 1 | 160 | 98 | 532 | 14.6 | 102 | 141 | 243 |
| 2 | 40 | 99 | 506 | 23.8 | 204 | — | — |
| 3 | 43 | 97 | 523 | 14.5 | 186 | — | — |
| 4 | 41 | 99 | 525 | 22.2 | 190 | — | — |

Table 1 — Continued

| Example | Reaction time, min. | Conversion, % | Methyl formyl-stearate, g. | Residue, g. | Rh, mg. Residue | Rh, mg. Support | Rh, mg. Total[1] |
|---|---|---|---|---|---|---|---|
| 5 | 43 | 96 | 527 | 18.0 | 180 | — | — |
| 6 | 48 | 97 | 527 | 22.4 | 182 | 26 | 208 |
| 7 | 51 | — | 528 | 18.1 | 161 | — | — |
| 8 | 46 | 96 | 530 | 16.5 | 174 | — | — |
| 9 | 46 | 96 | 529 | 19.1 | — | — | — |
| 10 | 55 | 96 | 532 | 18.4 | 160 | — | — |
| 11 | 56 | 97 | 526 | 15.1 | 145 | 36 | 181 |

[1]Does not include the amounts lost due to analysis.

I claim:

1. In a method for recovering and reactivating rhodium catalysts in a process wherein unsaturated hydrocarbons, or unsaturated fatty compounds are hydroformylated at temperatures of about 100° to 300° C. with hydrogen and carbon monoxide under pressures of from atmospheric pressure to 3000 p.s.i.g. in the presence of a catalyst consisting of rhodium metal on a relatively inert support admixed with a trisubstituted phosphine, and wherein the hydroformylated reaction products are filtered and distilled leaving a residue which contains essentially all of the soluble rhodium, the improvement comprising the following steps:
   a. mixing said residue with a refractory catalyst support;
   b. volatilizing and carbonizing essentially all organic materials present in the mixture resulting from step (b) by heating said mixture to from 150° to 450° C. in an atmosphere such that volatile materials given off will be prevented from igniting;
   c. reacting in a suitable vessel essentially all of the carbonized material remaining from step (b) with oxygen contained in air at a temperature of from 350° to 1000° C. for a length of time sufficient to form carbon dioxide and water; and
   d. cooling said vessel and removing the resulting resupported catalyst.

2. A method as described in claim 1, wherein the refractory catalyst support is alumina, silica, or firebrick.

3. A method as described in claim 1, wherein the mixture resulting from step (a) contains from 0.1 to 10 weight percent rhodium based on rhodium metal.

4. A method as described in claim 3, wherein the mixture resulting from step (a) is volatilized and carbonized at a temperature of from 150° to 300° C.

5. A method as described in claim 1, wherein the carbonized material remaining from step (b) is heated in the presence of air to a temperature of from 500° to 700° C.

* * * * *